(12) United States Patent
Bergdahl et al.

(10) Patent No.: US 6,416,030 B1
(45) Date of Patent: Jul. 9, 2002

(54) DE-COUPLING MECHANISM FOR SEPARATING AXIAL RADIAL SPRING RATES IN AN ELASTOMERIC MOUNTING/ISOLATION SYSTEM

(75) Inventors: Mark Allan Bergdahl, Dearborn; Isiah Charles White, Ypsilanti, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/606,864

(22) Filed: Jun. 29, 2000

(51) Int. Cl.[7] .......................... F16M 13/00; F16F 7/00
(52) U.S. Cl. ................... 248/635; 267/140.2; 267/141; 267/153
(58) Field of Search ................ 248/635, 634; 267/140.2, 141.4, 139, 294, 141, 140.5

(56) References Cited

U.S. PATENT DOCUMENTS

| | | | |
|---|---|---|---|
| 2,273,869 A | * | 2/1942 | Julien .......................... 267/153 |
| 2,382,372 A | * | 8/1945 | Wallerstein, Jr. ......... 267/140.2 |
| 2,562,195 A | * | 7/1951 | Lee ....................... 267/140.13 |
| 2,926,881 A | * | 3/1960 | Painter .................... 267/141.4 |
| 3,250,565 A | * | 5/1966 | Jaskowiak ................. 296/35.1 |
| 3,266,139 A | * | 8/1966 | Adams ........................ 29/509 |
| 3,819,167 A | * | 6/1974 | Nakamura et al. .......... 267/139 |
| 4,391,436 A | * | 7/1983 | Fishbaugh ................ 267/141.1 |
| 4,522,378 A | | 6/1985 | Nelson ..................... 267/141.4 |
| 4,871,150 A | * | 10/1989 | Le Salver et al. ....... 267/140.13 |
| 4,921,203 A | * | 5/1990 | Peterson et al. ............. 248/635 |
| 4,957,279 A | * | 9/1990 | Thorn ...................... 267/140.5 |
| 4,995,598 A | * | 2/1991 | Ingham ...................... 267/293 |
| 5,024,425 A | * | 6/1991 | Schwerdt ................ 267/140.12 |
| 5,580,028 A | | 12/1996 | Tomczak et al. ............. 248/634 |
| 5,641,153 A | * | 6/1997 | Gwinn ........................ 267/294 |
| 5,743,509 A | * | 4/1998 | Kanda et al. ................ 248/635 |
| 5,842,677 A | | 12/1998 | Sweeney et al. ............. 248/635 |
| 5,959,642 A | | 9/1999 | Fujioka et al. ................ 347/37 |

FOREIGN PATENT DOCUMENTS

WO          WO81/00606          3/1981

* cited by examiner

*Primary Examiner*—Anita King
(74) *Attorney, Agent, or Firm*—Gregory P. Brown

(57) ABSTRACT

An elastomeric mounting/isolation assembly (10) having several annular elastomeric elements (12, 32, 34), several rigid sleeves (14, 16, 40), and a fastener (42), in which the radial and axial spring rates are effectively de-coupled from each other such that changing one spring rate has substantially no, or little, effect on the other spring rate. The de-coupled spring rates can enable the assembly to better meet diverse considerations involving noise, vibration, and/or harshness, commonly known as NVH, on the one hand, and vehicle dynamics on the other hand.

14 Claims, 2 Drawing Sheets

DE-COUPLING MECHANISM FOR SEPARATING AXIAL RADIAL SPRING RATES IN AN ELASTOMERIC MOUNTING/ISOLATION SYSTEM

BACKGROUND OF THE INVENTION

1. Field of the Invention

This invention relates to an elastomeric mounting/isolation system, especially a system for the undercarriage of a motor vehicle to isolate, or at least attenuate, the influence of certain road induced forces on the vehicle body.

2. Background Information

A known practice in the design and construction of motor vehicles is to mount the vehicle body on a frame or subframe of the vehicle chassis using an elastomeric mounting/isolation system that comprises several elastomeric mounting/isolation assemblies at appropriate locations. In the ensuing description, the word "frame" will be used in a generic sense to denote any of various types of automotive vehicle frames.

One type of elastomeric mounting/isolation assembly comprises an annular elastomeric element, a rigid inner tubular sleeve, typically metal, passing concentrically through the elastomeric element, and a rigid outer tubular sleeve, also typically metal, within which the annular elastomeric element is concentrically disposed. An outer cylindrical surface of the annular elastomeric element joins with the inner cylindrical surface of the outer tubular sleeve in any suitable manner, such as by bonding of the elastomer to the sleeve. An inner cylindrical surface of the annular elastomeric element joins with the outer cylindrical surface of the inner tubular sleeve in any suitable manner, such as by bonding of the elastomer to the sleeve. The outer tubular sleeve is mounted on a vehicle frame in any suitable manner so as to be immovable on the frame The mounting may be accomplished by steps that include press-fitting the outer sleeve to an aperture of the frame.

The assembly further comprises: a second annular elastomeric element; a third annular elastomeric element; two rigid end caps, or end plates, which are typically metal; and a fastener. The inner tubular sleeve has an axial dimension sufficiently long that it protrudes in each of opposite axial directions beyond both the first annular elastomeric element and the outer tubular sleeve. Each end cap comprises a circular disk having a hole at its center. One end cap is disposed concentric with and against one end of the inner tubular sleeve while the other end cap is disposed concentric with and against the opposite end of that sleeve. The second elastomeric element is disposed concentric with both tubular sleeves and the first elastomericelement, but radially outward beyond the outer tubular sleeve, and between the frame and one of the end caps. The third elastomeric element is disposed concentric with both tubular sleeves and the first elastomeric element, but radially outward beyond the outer tubular sleeve, and between the frame and the other end cap. The other end cap is disposed to bear against a portion of the vehicle body.

The fastener, which may be a headed screw having a threaded shank, is used to fasten the assembly to the body. The screw shank passes through the one end cap, the inner tubular sleeve, the other end cap, and threads into a hole in the vehicle body. As the fastener is tightened by turning its head with a suitable fastening tool, the two end caps and inner tubular sleeve are immovably sandwiched together against the body, with the other end cap bearing directly against the body.

At the location where it mounts between the body and chassis, an elastomeric mounting/isolation assembly allows limited relative three-dimensional spatial motion between the frame and body. One dimension of motion is along the axis of the assembly. The other two dimensions are radial to the axis. The particular characteristics of the elastomers, such as dimensions, materials, durometers, etc., determine the ability of an assembly to perform its intended purpose of isolating and/or attenuating the influence of road-induced forces on the body. Those characteristics may be selected by mathematical and/or empirical analysis, in an effort to tune an assembly to produce a desired response in a particular application in a particular motor vehicle.

The construction of the assembly causes the characteristics of all three elastomeric elements to determine response of the assembly to certain types of relative motion. This inherent coupling of the elastomeric elements may impair the ability of an assembly to be tuned in a manner that best addresses both NVH (noise, vibration, harshness) and vehicle handling considerations. For example, a certain coupling exists between the radial and axial spring rates of the elastomeric elements. Changing elastomeric element characteristics to achieve a desired radial spring rate inherently affects axial spring rate, and vice versa.

SUMMARY OF THE INVENTION

As a result of the inventors' recognition of these limitations on tuning such an assembly, they have conceived a novel and improved construction in which the elastomeric elements are effectively de-coupled such that changing one spring rate has substantially no effect on the other spring rate, and vice versa, or at least a significantly lesser effect than in the prior device described above. It is believed that this capability can enable an elastomeric isolator/mounting assembly to better meet diverse considerations involving NVH on the one hand and vehicle dynamics on the other.

Accordingly, a general aspect of the invention relates to an elastomeric mounting/isolation assembly for interfacing relatively movable members comprising a first annular elastomeric element, a rigid inner tubular sleeve disposed concentrically within the elastomeric element, and a rigid outer tubular sleeve within which the annular elastomeric element is concentrically disposed. The annular elastomeric element has an outer cylindrical surface joining with an inner cylindrical surface of the outer tubular sleeve and an inner cylindrical surface joining with an outer cylindrical surface of the inner tubular sleeve. A rigid end member that has a central through-hole aligned with the inner tubular sleeve is disposed axially beyond one of the two relatively movable members relative to the other of the two relatively movable members. A second elastomeric element is disposed radially outward beyond the outer tubular sleeve and axially between the one relatively movable member and the end member. A third elastomeric element is disposed radially outward beyond the outer tubular sleeve and axially between the two relatively movable members. A fastener, including a guide, fastens the end member and the other relatively movable member together, while disposing the guide within the inner tubular sleeve so that the inner tubular sleeve can slide axially along the guide, while causing the second elastomeric element to be held compressed between the end member and the one relatively movable member, and while causing the third elastomeric element to be held compressed between the two relatively movable members.

Another general aspect of the invention relates to an automotive vehicle having at least one assembly, as described in the preceding paragraph, mounting the vehicle body on the undercarriage.

Further aspects will be seen in various features of a presently preferred embodiment of the invention that will be described in detail and in principles of the invention as set forth in various claims.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
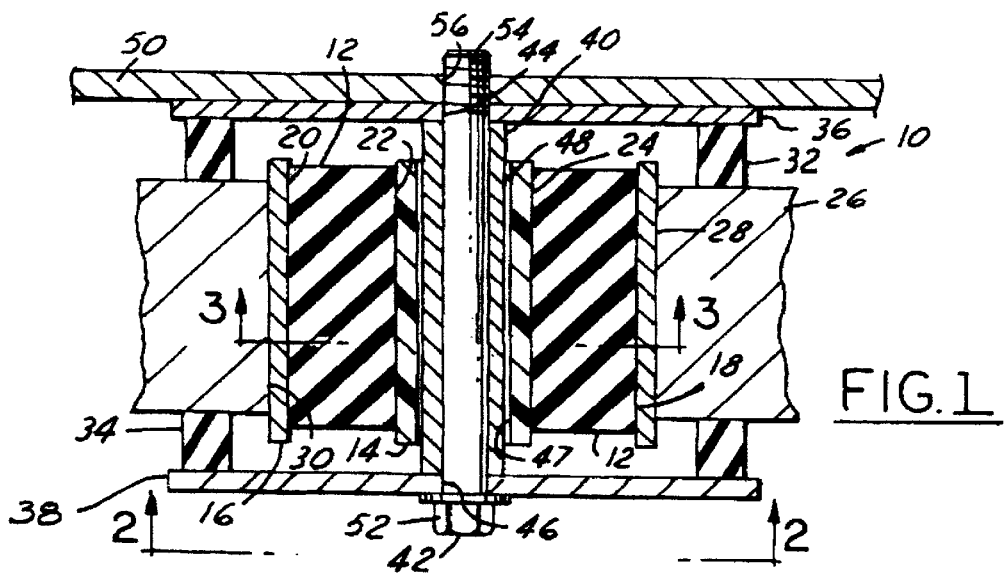
FIG. 1 is a longitudinal cross section view taken substantially in the direction of arrows 1—1 in FIG. 2 and illustrating an exemplary first embodiment of device according to Principles of the present invention.
Figure 2:
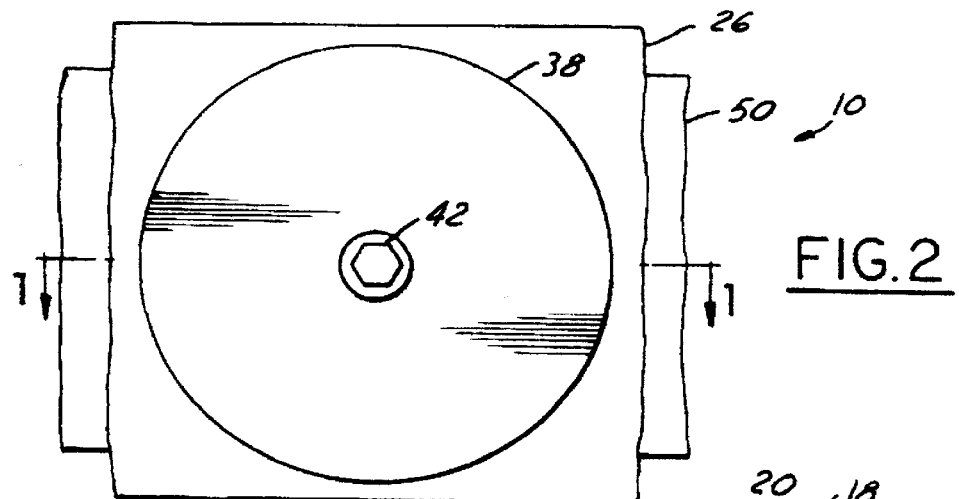
FIG. 2 is a full bottom plan view taken in the direction of a arrows 2—2 in FIG. 1.
Figure 3:
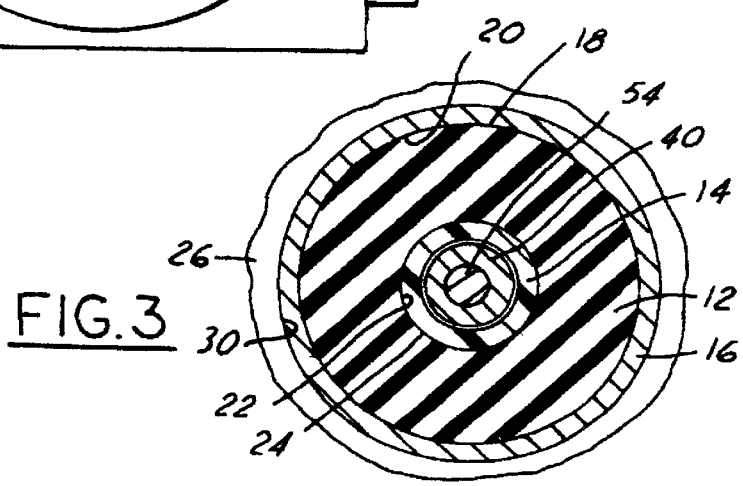
FIG. 3 is a full transverse cross section view taken in the direction of arrows 3—3 in FIG. 1.

FIGS. 1–3 disclose an elastomeric mounting/isolation assembly 10 embodying principles of the present invention. Assembly 10 comprises a first annular elastomeric element 12, a rigid inner tubular sleeve 14, and a rigid outer tubular sleeve 16. Elastomeric element 12 is concentrically disposed within outer sleeve 16 and has an outer cylindrical surface 18 that joins with an inner cylindrical surface 20 of sleeve 16 in any suitable manner, such as by bonding of the elastomer to the sleeve. An inner cylindrical surface 22 of elastomeric element 12 joins with an outer cylindrical surface 24 of inner tubular sleeve 14 in any suitable manner, such as by bonding. Various materials such as natural rubber compounds, microcellular urethanes, and other natural and synthetic compounds and materials are suitable for elastomeric element 12 and other elastomeric elements to be described later.

Outer tubular sleeve 16 mounts on a frame 26 of a motor vehicle in any suitable manner so as to be immovable on the frame. The mounting may be accomplished by steps that include press-fitting an outer cylindrical surface 28 of the sleeve to an aperture 30 of the frame.

Assembly 10 further comprises a second annular elastomeric element 32, a third annular elastomeric element 34, two rigid end caps, or end plates, 36, 38, a rigid sleeve 40, and a fastener 42. Elastomeric elements 32, 34 are shown by way of example to be circumferentially continuous rings of uniform thickness, and end caps 36, 38, flat circular disks, steel for example, having respective through-holes 44, 46 at their centers. Sleeve 40 has an axial dimension sufficiently long that it protrudes in each of opposite axial directions beyond inner sleeve 14, beyond elastomeric element 12, and beyond outer sleeve 16.

End cap 36 is disposed concentric with and against one end of sleeve 40 while end cap 38 is disposed concentric with and against the opposite end of the sleeve. Elastomeric element 32 is disposed concentric with the tubular sleeves and with the elastomeric element 12, but radially outward beyond outer tubular sleeve 16, and between frame 26 and end cap 36. Elastomeric element 34 is disposed concentric with the tubular sleeves and elastomeric element 12, but radially outward beyond sleeve 16, and between frame 26 and end cap 38. End cap 36 is disposed to bear against a body portion 50 of the motor vehicle.

Fastener 42 comprises a screw having a head 52 and a threaded shank 54 for fastening assembly 10 to body portion 50. Shank 54 is passed through end cap 38, sleeve 40, end cap 36, and threaded into a hole 56 in body portion 50. As fastener 42 is being tightened by turning head 52 with a suitable fastening tool (not shown), both end caps 36, 38 and sleeve 40 are becoming immovably sandwiched together against body portion 50 while end cap 36 is being forced to bear against body portion 50 in the process. Elastomeric elements 32, 34 are also axially compressed to a certain extent. The extent to which they are pre-compressed is controlled by the length of sleeve 40.

Sleeves 14 and 40 are constructed and arranged to provide for the former to slide axially on the latter, preferably with a close sliding fit characterized by minimum friction, particularly when subjected to radial forces. Radial clearance between the two sleeves is shown in FIG. 1, perhaps slightly exaggerated for illustration. Because sleeve 14 can slide axially on sleeve 40, the former may be referred to as a slider sleeve and the latter as a stationary guide sleeve. For low friction axial sliding of the radially inner surface 47 of slider sleeve 14 along the radially outer surface 48 of guide sleeve 40, it is desirable that the surface characteristic of at least one of the two confronting surfaces have a low coefficient of friction. This can be achieved in different ways, one of which is by the selection of suitable materials for the two sleeves, such as corrosion-resistant steel for one sleeve, guide sleeve 40 in the illustrated embodiment, and a synthetic, such as a fiber-reinforced plastic impregnated with lubrous material, for the other, slider sleeve 14 in the illustrated embodiment, A TEFLON®- or graphite-impregnated plastic is a representative material. TEFLON® is a trademark for a brand of polytetrafluoroethylene. Some other possible ways to achieve a low coefficient of friction will be discussed later.

At the location where it mounts between the body and chassis, assembly 10 allows limited relative three-dimensional spatial motion between frame 26 and body portion 50. One dimension of motion is along the axis of the assembly. The other two dimensions are radial to the axis. The particular characteristics of the three elastomeric elements 12, 32, 34, such as dimensions, materials, durometers, etc., determine the ability of an assembly to perform its intended purpose of isolating and/or attenuating the influence of road-induced forces on the body. Those characteristics may be selected by mathematical and/or empirical analysis, in an effort to tune an assembly to produce a desired response in a particular application in a particular motor vehicle.

Because of the ability of slider sleeve 14 to slide axially on guide sleeve 40, the elastomeric elements 32, 34 are effectively de-coupled from the elastomeric element 12 such that changing one spring rate, such as radial spring rate, has substantially no, or little, effect on the other spring rate, such as axial spring rate, and vice versa. It is believed that the de-coupled spring rates can enable an elastomeric isolator/mounting assembly 10 to better meet diverse considerations involving NVH on the one hand and vehicle dynamics on the other.

The embodiment of FIGS. 1–3 is suitable for development purposes. For production purposes, an embodiment 10A like that shown in FIGS. 4 and 5 may be preferred because it involves fewer individual parts that must be assembled in an automotive vehicle assembly plant. Components in FIGS. 4 and 5 that find correspondence in FIGS. 1–3 are marked by corresponding reference numerals and need not be described further. The differences between the two embodiments however should be discussed.

Embodiment 10A differs from embodiment 10 in that there is no end plate, or cap, 36, in that tubular outer sleeve 16 includes, at one axial end, a radial flange 16f, and in that elastomeric element 32 is disposed on flange 16f. In fact element 32 can be joined to flange 16f in any suitable manner, such as by bonding, thereby making a single assembly out of itself, sleeves 14 and 16, and element 12. Sleeve 14 is fit to aperture 30 such that flange 16f abuts frame 26, bearing against the margin of aperture 30. When assembly 10A is assembled to body portion 50, elastomeric element 32 is forcefully held with a certain degree of compression between body portion 50 and flange 16f. If desired, an end cap 36 could be included such that element 32 would be held between it and flange 16f, and it should perhaps be noted that end cap 36 could be omitted from assembly 10 in FIG. 1 if it were deemed appropriate to have element 32 bear directly against body portion 50, rather than bearing against body portion 50 through the intervening end cap 36.

Figure 4:
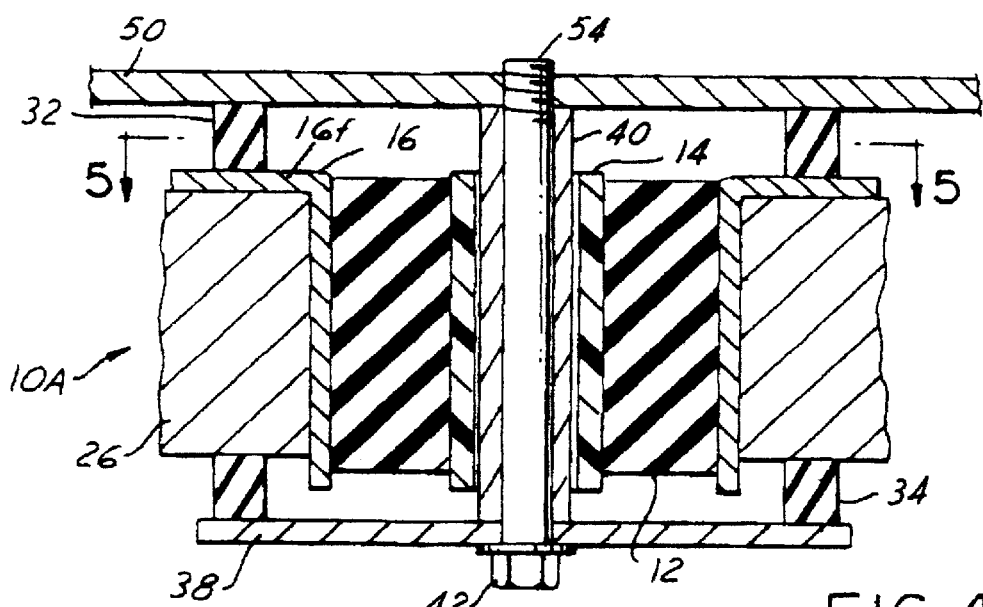
FIG. 4 is a longitudinal cross section view illustrating an exemplary second embodiment of device according to principles of the present invention.
Figure 5:
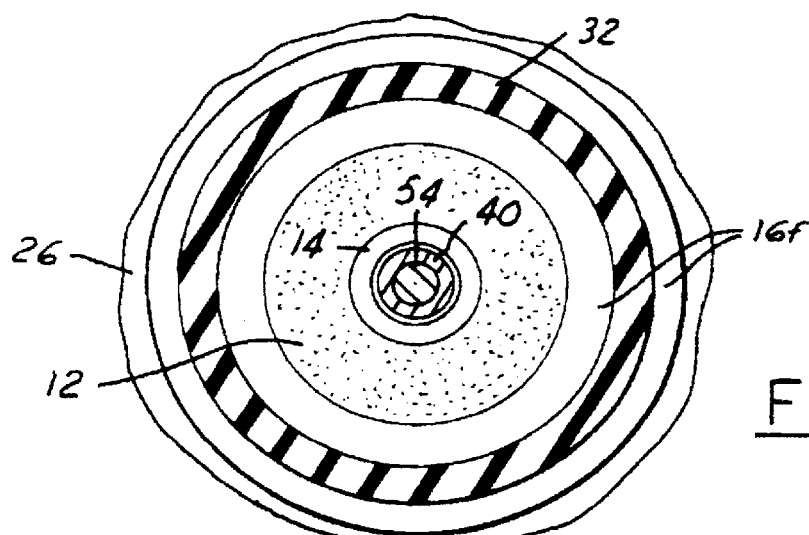
FIG. 5 is a transverse cross section view taken in the direction of arrows 5—5 in FIG. 4.
Figure 6:
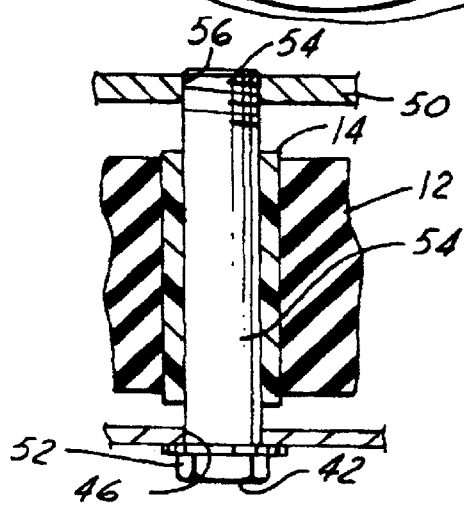
FIG. 6 is a partial longitudinal cross section view showing a modification.

FIG. 6 shows a modification of FIG. 4 that does not include a separate guide sleeve 40. Screw 42 is constructed such that a portion of the length of its shank 54 provides the cylindrical guide surface that confronts the radially inner surface of slider sleeve 14. The distal end remains threaded for attachment to body portion 50. Proximal to the thread, shank 54 has a shoulder that bears against body portion 50 when the screw is threaded tightly into the body portion. This shoulder defines a length along which slider sleeve 14 can travel, and that length also establishes the extent to which elastomeric elements 32 and 34 are pre-compressed. This modification may also be applied to assembly 10, although not shown by a specific drawing Figure.

A low friction interface between slider sleeve 14 and a confronting guide surface, such as either the separate guide sleeve 40 as in FIGS. 1 and 4 or the screw shank 54 as in FIG. 6, may be achieved in additional ways. One such way is to make slider sleeve 14 a metal, such as corrosion-resistant steel, and the guide a synthetic, such as TEFLON®- or graphite-impregnated, fiber-reinforced plastic. Where the screw shank is used as the guide, the portion that serves as the guide could be a sleeve of suitable material joined to the body of the shank, such as a synthetic sleeve shrunk, or tightly fit, onto an otherwise steel shank. Still another way to achieve low friction sliding is by applying suitable lubricant between the sliding surfaces and containing the lubricant in a suitable manner such as by seals. An example of suitable seals for sealing the sliding surfaces from the outside environment are bellows seals. One bellows seal seals one end of the slider sleeve and another seal, the opposite end. One end of each bellows seal fits over and around a respective end of the slider sleeve in a sealed manner. The opposite end of each bellows seal seals to the guide, either the guide sleeve or the screw shank depending on which is used as the guide for the slider sleeve.

While a presently preferred embodiment has been illustrated and described, it is to be appreciated that the invention may be practiced in various forms within the scope of the following claims. Although certain elements may be described as having a concentric relationship with each other, it should be understood that concentric relationships include those of exact concentricity and well as those where there is some limited departure from exact concentricity.

What is claimed is:

1. An elastomeric mounting/isolation assembly for interfacing relatively movable members comprising, in combination with the relatively movable members:

a first annular elastomeric element;

a rigid inner tubular sleeve disposed concentrically within the elastomeric element;

a rigid outer tubular sleeve within which the annular elastomeric element is concentrically disposed;

the annular elastomeric element having an outer cylindrical surface joining with an inner cylindrical surface of the outer tubular sleeve and an inner cylindrical surface joining with an outer cylindrical surface of the inner tubular sleeve;

a rigid end member that has a central through-hole aligned with the inner tubular sleeve and that is disposed axially beyond one of the two relatively movable members relative to the other of the two relatively movable members, a second elastomeric element disposed radially outward beyond the outer tubular sleeve, and axially between the one relatively movable member and the end member;

a third elastomeric element disposed radially outward beyond the outer tubular sleeve, and axially between the two relatively movable members; and a fastener, including a guide, for fastening the end member and the other relatively movable member together, while disposing the guide within the inner tubular sleeve so that the inner tubular sleeve can slide axially along the guide, while causing the second elastomeric element to be held compressed between the end member and the one relatively movable member, and while causing the third elastomeric element to be held compressed between the two relatively movable members.

2. An elastomeric mounting/isolation assembly for interfacing relatively movable members, in combination with the relatively movable members, as set forth in claim 1 in which the rigid end member comprises a circular disk having the through-hole at the center.

3. An elastomeric mounting/isolation assembly for interfacing relatively movable members, in combination with the relatively movable members, as set forth in claim 1 in which the relatively movable members comprise respectively, a vehicle frame and a vehicle body mounted on the vehicle frame.

4. An elastomeric mounting/isolation assembly for interfacing relatively movable members, in combination with the relatively movable members, as set forth in claim 3 in which the outer tubular sleeve mounts on the frame.

5. An elastomeric mounting/isolation assembly for interfacing relatively movable members, in combination with the relatively movable members, as set forth in claim 4 in which the outer tubular sleeve is fit to an aperture of the frame.

6. An elastomeric mounting/isolation assembly for interfacing relatively movable members, in combination with the relatively movable members, as set forth in claim 5 in which the outer tubular sleeve comprises an axial end having a radial flange that is disposed against a margin of the aperture in the frame, and the third elastomeric element is disposed on the radial flange.

7. An elastomeric mounting/isolation assembly for interfacing relatively movable members, in combination with the relatively movable members, as set forth in claim 5 including another rigid end member disposed axially between the third elastomeric element and the body.

8. An elastomeric mounting/isolation assembly for interfacing relatively movable members, in combination with the relatively movable members, as set forth in claim 1 in which the guide comprises a cylindrical portion of a shank of the fastener.

9. An elastomeric mounting/isolation assembly for interfacing relatively movable members, in combination with the relatively movable members, as set forth in claim 1 in which the guide comprises a rigid tubular guide sleeve through which a shank of the fastener passes, and the guide sleeve is axially captured between the end member and the other relatively movable member.

10. An elastomeric mounting/isolation assembly for interfacing relatively movable members, in combination with the relatively movable members, as set forth in claim 9 including another rigid end member which comprises a through-hole through which the fastener passes, which is disposed axially between the other relatively movable member and the third elastomeric element, and through which the guide sleeve bears against the other relatively movable member.

11. An elastomeric mounting/isolation assembly for interfacing relatively movable members, in combination with the relatively movable members, as set forth in claim 10 in which one of the guide and the inner tubular sleeve comprises a synthetic material.

12. An elastomeric mounting/isolation assembly for interfacing relatively movable members, in combination with the relatively movable members, as set forth in claim 11 in which the synthetic material comprises plastic that is impregnated with lubrous material.

13. An elastomeric mounting/isolation assembly for interfacing relatively movable members, in combination with the relatively movable members, as set forth in claim 11 in which the guide is a corrosion-resistant metal and the inner tubular sleeve comprises synthetic material.

14. An elastomeric mounting/isolation assembly for interfacing relatively movable members, in combination with the relatively movable members, as set forth in claim 1 in which the second elastomeric element and the third elastomeric element comprise respective circumferentially continuous rings concentric with the inner tubular sleeve.

* * * * *